Oct. 26, 1965     S. I. MORROW     3,214,237
METHOD OF MAKING NITROGEN FLUORIDES
Filed Sept. 6, 1960
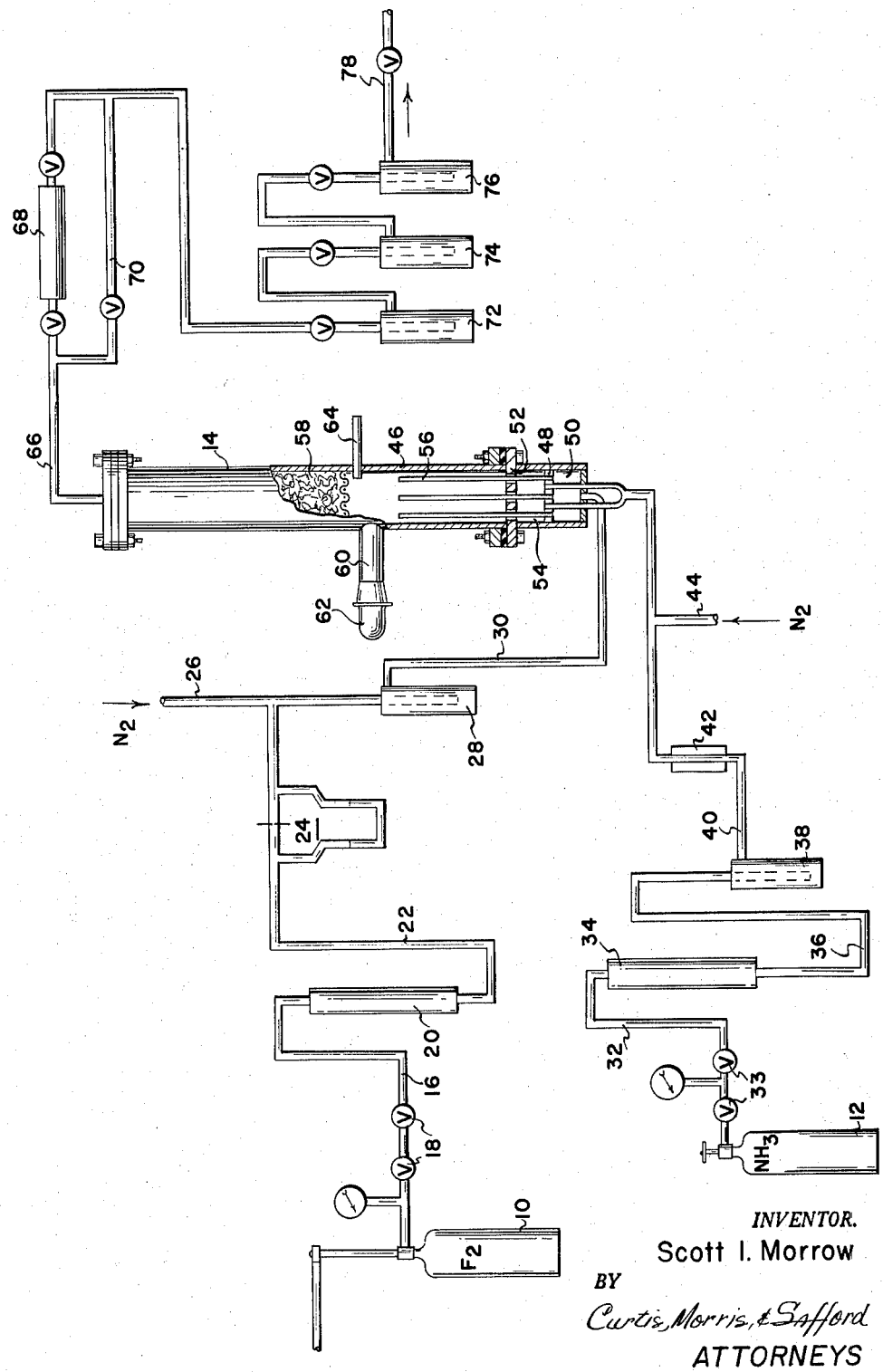
INVENTOR.
Scott I. Morrow
BY
*Curtis, Morris, & Safford*
ATTORNEYS

United States Patent Office 3,214,237
Patented Oct. 26, 1965

3,214,237
METHOD OF MAKING NITROGEN FLUORIDES
Scott I. Morrow, Morris Plains, N.J., assignor to Thiokol Chemical Corporation, Bristol, Pa., a corporation of Delaware
Filed Sept. 6, 1960, Ser. No. 53,964
6 Claims. (Cl. 23—14)

This invention relates to the production of certain nitrogen fluorides, especially perfluorohydrazine (dinitrogen tetrafluoride).

It is known that various compounds of nitrogen and fluorine are powerful though somewhat unstable oxidizing agents and may be used in a variety of chemical reactions wherein such oxidizing agents are required. In recent years there has been an increasing interest in these compounds because of their possible utility as the oxidizer component in liquid propellant rocket motors. In some cases, as for example, where the boiling point and stability of the compound are within acceptable limits, the compound may be used per se as the oxidizer component of a liquid propellant. In other cases the nitrogen fluoride may be used as an intermediate in preparation of a more stable liquid or solid propellant component. Perfluorohydrazine, which has a boiling point of —73° C. and is reasonably stable, can be used in either of these two ways.

While perfluorohydrazine is a known compound and a number of its properties have been determined, it is a difficult compound to prepare, and the previously proposed methods of making it leave considerable to be desired. It is accordingly an object of the present invention to provide an improved method of making perfluorohydrazine. It is another object of the invention to provide a method of making a number of other nitrogen fluorides, e.g., dinitrogen difluoride and difluoroamine, which like perfluorohydrazine are strong oxidizers and which can be used to introduce fluorimino groups (=N—F) and difluoroamino groups (—NF$_2$) into organic and organo-boron substrates. Other objects of the invention will be in part obvious and in part pointed out hereafter.

The present process is based on the discovery that ammonia and elemental fluorine can be reacted in the presence of a copper catalyst under suitable conditions as outlined below to produce a reaction product containing substantial amounts of perfluorohydrazine and lesser amounts of dinitrogen difluoride and difluoroamine. In carrying out the present process ammonia and elemental fluorine in gaseous form are mixed and passed through a permeable body of copper catalyst such as a mass of copper gauze or copper wool. The reaction proceeds at an acceptable rate at atmospheric temperatures and pressures. Since the reaction is mildly exothermic an increase in the temperature of the reacting gases of the order of 5° to 15° C. occurs during the course of the reaction. Desirably the reaction is carried out at a temperature within the range 0° to 50° C.

In carrying out the present process the ammonia and elemental fluorine are preferably separately diluted with nitrogen and then mixed in such proportions as to provide a stoichiometric excess of ammonia. Good results have been obtained when using a molar ratio of ammonia to fluorine within the range 1.5:1 to 2:1. The mixed gases are passed through a body of copper catalyst to produce a reaction product comprising a mixture of nitrogen fluorides. The major component of this reaction product is nitrogen trifluoride, but as indicated in more detail hereafter, the product also contains a substantial amount of perfluorohydrazine and lesser amounts of dinitrogen difluoride and difluoroamine.

Upon leaving the catalyst bed, the nitrogen fluorides are condensed out of the gaseous mixture by passing the mixture through one or more cold traps. Separation of the several nitrogen fluorides can be effected by fractional vaporization in the manner described hereafter.

In order to point out more fully the nature of the present invention, reference will now be made to the accompanying drawing which illustrates apparatus capable of being used in carrying out the process of the invention. Referring to the drawing, elemental fluorine from a pressure cylinder 10 and ammonia from a pressure cylinder 12 are fed independently to a reactor 14 for reaction therein. More particularly, fluorine from the cylinder 10 flows through a pipe 16 to an absorber 20 containing a bed of sodium fluoride for removing any hydrogen fluoride that may be present in the fluorine gas. The flow of fluorine is regulated by valves 18.

From the absorber 20, the fluorine flows through pipe 22 which contains an orifice flow meter 24 for measuring the flow thereof. In pipe 22, the fluorine is mixed with dry nitrogen diluent gas entering through branch pipe 26. The mixed gas flows through a trap 28 and thence through pipe 30 to reactor 14.

Ammonia from the pressure cylinder 12 flows through pipe 32 under the control of a pair of needle valves 33 to and through an absorber 34 which contains a bed of soda lime to absorb moisture that may be present in the ammonia gas. From absorber 34 the ammonia flows through pipe 36 to a trap 38 that is maintained at —23° C. to further dehydrate the ammonia. Upon leaving trap 38 the ammonia flows through a pipe 40 containing a rotameter 42 for measuring the flow thereof, and is then mixed with dry diluent nitrogen entering through pipe 44 and flows to the reactor 14.

The reactor comprises an elongated tubular casing 46, preferably made of copper, and having near its lower end a partition 48 which cooperates with the casing to define a fluorine distributing chamber 50. Above the partition 48 there is a second partition 52 which defines with partition 48 and portions of the casing an ammonia distributing chamber 54. The mixture of fluorine and diluting nitrogen enters the distributing chamber 50 and flows upwardly through a series of tubes 56 mounted in the partition 48 and extending through the partition 52. The entering mixture of ammonia and nitrogen flows into the distributing chamber 54 and then upwardly through the partition 52 around the tubes 56. At the upper end of tubes 56 the fluorine and ammonia are mixed, and the mixed gas flows through a catalyst bed 58 which consists of a mass of copper gauze. The reactor 14 is provided with a side arm 60 having a pressure-rupturable cap 62 as a safety device. Extending through the wall 46 of the reactor there is a thermocouple well 64 within which a thermocouple may be inserted to measure the temperature of the gases flowing through the reactor.

As the gases pass through the catalyst bed 58, the ammonia and fluorine react to form nitrogen fluorides as more particularly described in the specific examples given hereafter. The reaction products leaving the reactor flow through pipe 66 to an absorber 68 which is provided with a by-pass 70 and suitable control valves for directing the flow of gas through the by-pass when desired. The absorber 68 is filled with a material suitable for absorbing unreacted ammonia from the product gases employed and may be for example anhydrous calcium chloride or a so-called molecular sieve material such as that identified as Linde type 4A. Also, unreacted ammonia may be removed from the reaction products by passing them through a water scrubber.

After leaving absorber 68, the product gases pass serially through the cold traps 72, 74 and 76. The cold trap 72 is maintained at −78° C. and the traps 74 and 76 at −196° C. Various components of the product gases are condensed in each of these traps. Uncondensed components of the reaction product leaves the system through pipe 78.

In order to point out still further the nature of the present process, the following specific examples are given of illustrative procedures within the scope of the invention.

*Example 1*

A run was made in apparatus of the type shown in the drawing and described above wherein the following flow rates were used:

|  | Liters per hour |
|---|---|
| Fluroine | 2.3 |
| Ammonia | 3.6 |
| Nitrogen | 12 |

The molar ratio of ammonia to fluorine in this gas mixture was about 1.5:1. The gas mixture was fed to the catalyst bed at 20° C. and a 4° C. temperature rise occurred within the bed. Water was used as the absorbent medium for absorbing unreacted ammonia from the reaction products. The run was continued for a period of four hours after which the condensates collected in traps 74 and 76 were analyzed. No condensate was observable in trap 72.

The condensate collected in traps 74 and 76, which was essentially composed of nitrogen trifluoride and dinitrogen tetrafluoride, was distilled at about −142° C. into a trap at −196° C. Since these two compounds have quite different volatilities, a reasonably good separation between them was achieved in this way. It was found that 48.5 millimols of nitrogen trifluoride and 9.15 millimols of perfluorohydrazine had been produced. Infrared spectroscopic analysis of the fractions condensed in traps 74 and 76 showed that they contained a small amount of dinitrogen difluoride.

*Example 2*

The procedure of Example 1 was followed except that the ammonia feed rate was increased to 4.8 liters per hour to give a molar ratio of ammonia to elemental fluorine of 2:1. At the end of two hours, the condensates were analyzed and found to contain 29.3 millimols of nitrogen trifluoride and 1.6 millimols of perfluorohydrazine.

*Example 3*

In this run, the gaseous mixture fed to the catalyst bed comprised 1.8 liters per hour of fluorine, 2.7 liters per hour of ammonia and 9 liters per hour of nitrogen, with a feed ratio of ammonia to fluorine of 1.5:1. A temperature increase of about 12° C. was noted as the gas passed through the catalyst bed. The gas feed was continued for a period of about three hours at the end of which time the collected condensate was analyzed. The analysis indicated the formation of 30.4 millimols of nitrogen trifluoride and 1.7 millimols of perfluorohydrazine. In addition difluoroamine of an amount in excess of 0.9 millimol was obtained. This was confirmed by infra-red spectroscopic analysis. The difluoroamine was collected in the trap 72 at −78° C.

*Example 4*

In this run, the gas feed rates were as follows:

|  | Liters per hour |
|---|---|
| Fluorine | 1.5 |
| Ammonia | 2.7 |
| Nitrogen | 7.6 |

The molar ratio of ammonia to fluorine was 1.8:1 and the run was continued for two hours. Analysis of the collected condensate showed that it contained 19.6 millimols of nitrogen trifluoride and 5.3 millimols of perfluorohydrazine.

It is of course to be understood that the foregoing examples are illustrative only and that numerous changes can be made in the ingredients, proportions and conditions described therein without departing from the spirit of the invention. It has been found that a variety of known separating techniques can be used to separate the several nitrogen fluorides contined in the reaction product. Thus fractional distillation through the well-known Podbielniak column and fractional condensation can be usefully employed. In the case of the dinitrogen difluoride and difluoroamine, which may be present in quite small quantities in the product, mass spectrometric separating techniques are useful. Other modifications within the scope of the invention will be apparent to those skilled in the art.

I claim:

1. The method of making dinitrogen tetrafluoride which comprises passing a mixture of ammonia and fluorine gases wherein the molar ratio of ammonia to fluorine is from 1.5:1 to 2:1 through a permeable copper catalyst mass at a temperature of 0° to 50° C. to form a reaction product containing dinitrogen tetrafluoride.

2. The method of making dinitrogen tetrafluoride which comprises passing a mixture of ammonia and fluorine gases wherein the molar ratio of ammonia to fluorine is from 1.5:1 to 2:1 through a catalyst composed of copper gauze at a temperature of 0° to 50° C. to form a reaction product containing dinitrogen tetrafluoride.

3. The method of making dinitrogen tetrafluoride which comprises passing a mixture of ammonia and fluorine gases wherein the molar ratio of ammonia to fluorine is from 1.5:1 to 2:1 through a catalyst composed of copper gauze to form a reaction product containing dinitrogen tetrafluoride and distilling the reaction product to recover dinitrogen tetrafluoride therefrom.

4. The method of making dinitrogen tetrafluoride which comprises passing a mixture of ammonia and fluorine wherein the molar ratio of ammonia to fluorine is from 1.5:1 to 2:1 through a catalyst bed composed of copper gauze at a temperature of 0° to 50° C. to form a reaction product containing dinitrogen tetrafluoride, and distilling said reaction product to recover said dinitrogen tetrafluoride therefrom.

5. The process which comprises passing a mixture of ammonia and fluorine gases wherein the molar ratio of ammonia to fluorine is from 1:5 to 2:1 through a permeable copper catalyst mass to form a reaction product containing dinitrogen difluoride and recovering the dinitrogen difluoride from the reaction product.

6. The process which comprises passing a mixture of ammonia and fluorine gases wherein the molar ratio of ammonia to fluorine is from 1:5 to 2:1 through a permeable copper catalyst mass to form a reaction product containing difluoramine and recovering the difluoroamine from the reaction product.

References Cited by the Examiner

Colburn et al.: "J. Am. Chem. Soc.," vol. 80 (1958), p. 5004.

Morrow et al.: "J. Am. Chem. Soc.," vol. 81, Dec. 5, 1959, pp. 6338, 6339.

Morrow et al.: "Abstracts of Papers, 137th Meeting, American Chemical Society, 1960," pp. 11M, 12M.

Ruff et al.: "Z. Anorg Allgem. Chemic," vol. 197 (1931), pp. 395–398.

Simons: "Fluorine Chemistry," vol. I (1950), pp. 85–87.

MAURICE A. BRINDISI, *Primary Examiner.*

ROGER L. CAMPBELL, CARL D. QUARFORTH,
*Examiners.*